July 3, 1962 D. H. GAMBLE ETAL 3,042,890
PLUG-IN LOW-IMPEDANCE BUS DUCT
Filed Oct. 30, 1958 2 Sheets-Sheet 1

WITNESSES
John E. Healy, Jr.
James F. Young

INVENTORS
Dennis H. Gamble &
Charles L. Weimer
BY
ATTORNEY

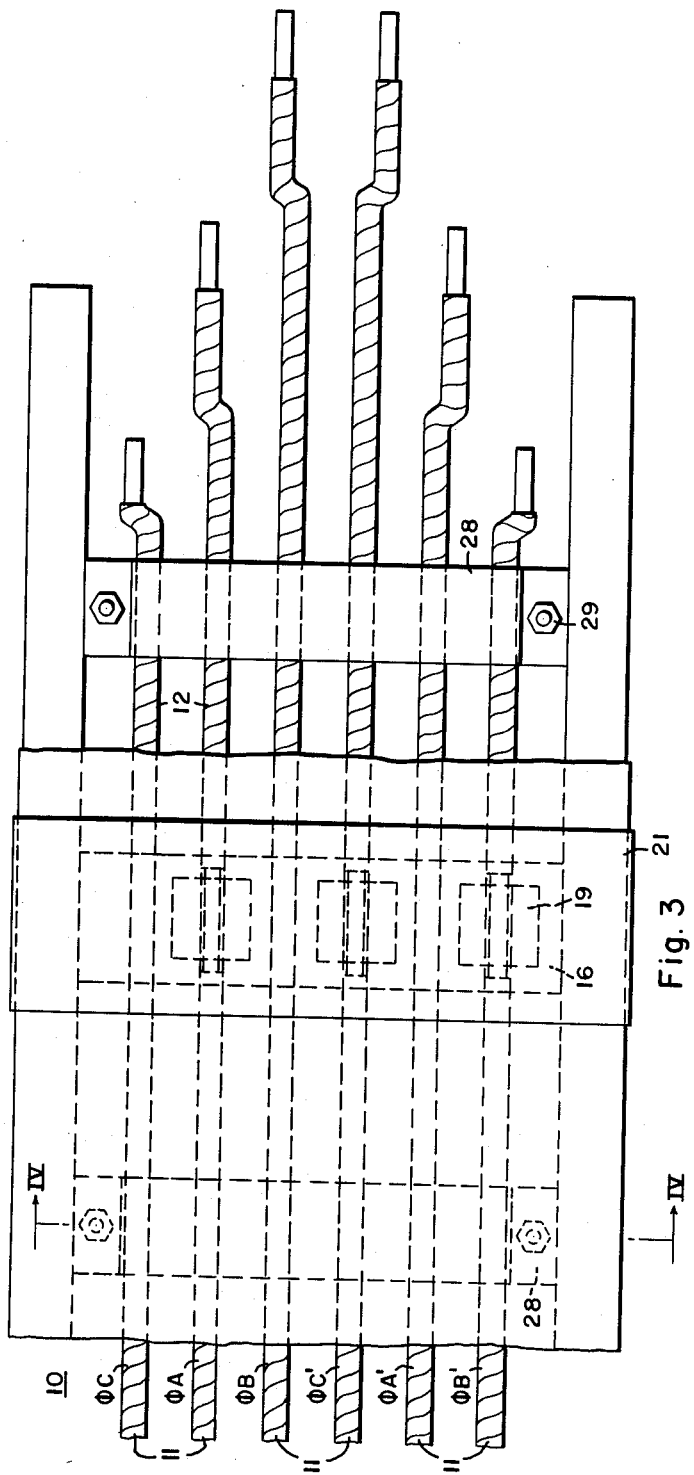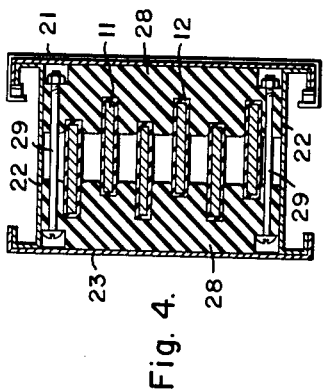

United States Patent Office 3,042,890
Patented July 3, 1962

3,042,890
PLUG-IN LOW-IMPEDANCE BUS DUCT
Dennis H. Gamble, Brighton Township, Beaver County, and Charles L. Weimer, Patterson Heights, Pa., assignors to Westinghouse Electric Corporation, East Pittsburgh, Pa., a corporation of Pennsylvania
Filed Oct. 30, 1958, Ser. No. 770,776
5 Claims. (Cl. 339—22)

This invention relates, generally, to bus duct for electrical distribution systems and, more particularly, to bus duct of the plug-in low-impedance type.

Heretofore, different types of bus duct have been manufactured. In one type, generally known as low-impedance duct, two or more bus bars are provided for each phase and the bars are mounted in closely spaced interlaced relation in a housing in order to reduce the impedance, thereby reducing the voltage drop. In another type, generally known as plug-in duct, only one bus bar is provided for each phase and the bars are spaced to permit their engagement by stab connectors or contact members of plug-in units removably attached to the duct housing. Because of the close spacing and arrangement of the bus bars in low-impedance duct, outlets have not been provided in its housing for the attachment of plug-in devices. Thus, the low-impedance duct lacked the advantages of the plug-in feature and the plug-in duct lacked the advantages of low impedance and low voltage drop.

An object of this invention is to provide bus duct having the advantages of plug-in convenience and low impedance in a single structure.

Another object of the invention is to provide for changing the phase sequence on the electrical connections of a bus duct plug-in unit.

A further object of the invention is to provide a bus duct plug-in unit having offset stab connectors which may be attached to either one of two opposite sides of a bus duct housing.

Other objects of the invention will be explained fully hereinafter or will be apparent to those skilled in the art.

In accordance with one embodiment of the invention, two bus bars are provided for each phase of a three-phase bus duct. The six bars are equally spaced vertically, but alternate bars are offset horizontally for engagement by stab connectors of plug-in units, thereby permitting the bars to be disposed relatively closely together to obtain a relatively low impedance. The bars are supported by insulators located inside the housing at staggered openings in opposite sides of the housing. The stab connectors of each plug-in unit are equally spaced, but are offset from the longitudinal center line of the unit housing.

For a better understanding of the nature and objects of the invention, reference may be had to the following detailed description, taken in conjunction with the accompany drawing, in which:

FIG. 3 is a view, similar to FIG. 1, of a modified bus structure, and

FIG. 4 is a reduced view, in section, taken along the line IV—IV shown in FIG. 3 at a point where additional insulators are located.

Figure 1:
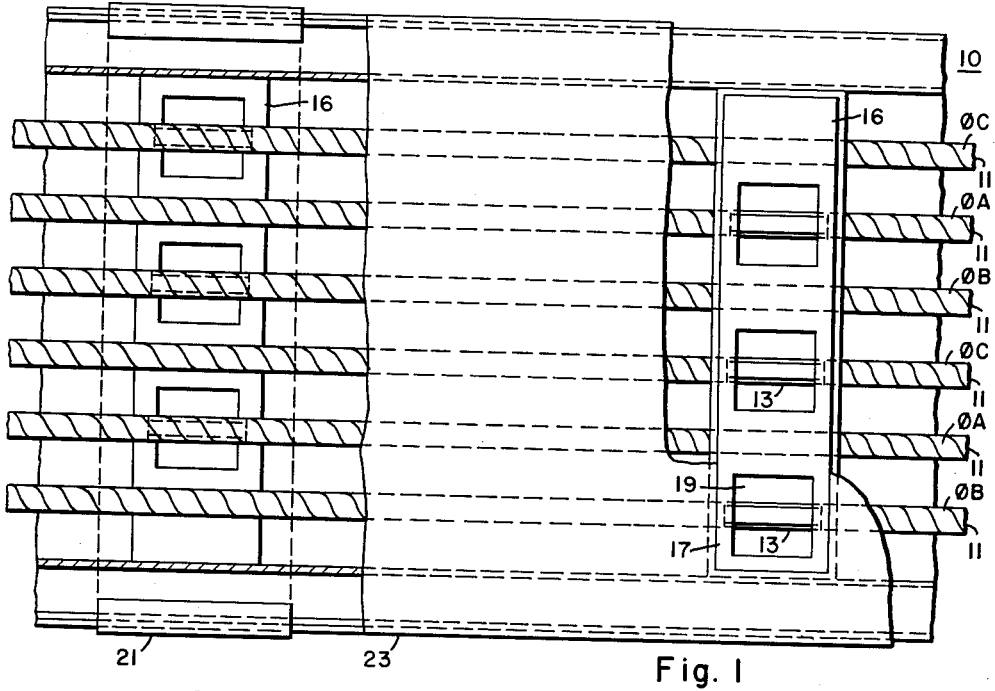
FIGURE 1 is a view, in side elevation, of a portion of a bus duct structure embodying the principal features of the invention, portions of the duct housing being broken away for clearness.

Referring to the drawings, the structure shown therein comprises a portion of one length or section of low impedance bus duct which, in general, may be of the type described in Patent 2,653,991 issued September 29, 1953, to L. W. Dyer and W. F. Born. However, some of the broader aspects of the invention are applicable to low-impedance or feeder duct of other types.

The bus duct structure comprises a generally rectangular sheet metal housing 10 inside of which are disposed six or more substantially flat bus bars 11, there being at least two bus bars per phase for a three-phase structure. The bus bars 11 are so mounted in the housing 10 that the plane of each bar is perpendicular to the greatest cross-sectional dimension of the housing. Furthermore, the planes of the bus bars are equally spaced and are parallel to each other. The corresponding phases of the bus bars 11 are designated C, A, B and C', A', B'. It will be understood that the two bars for each phase may be connected together at predetermined points in the structure.

Figure 2:
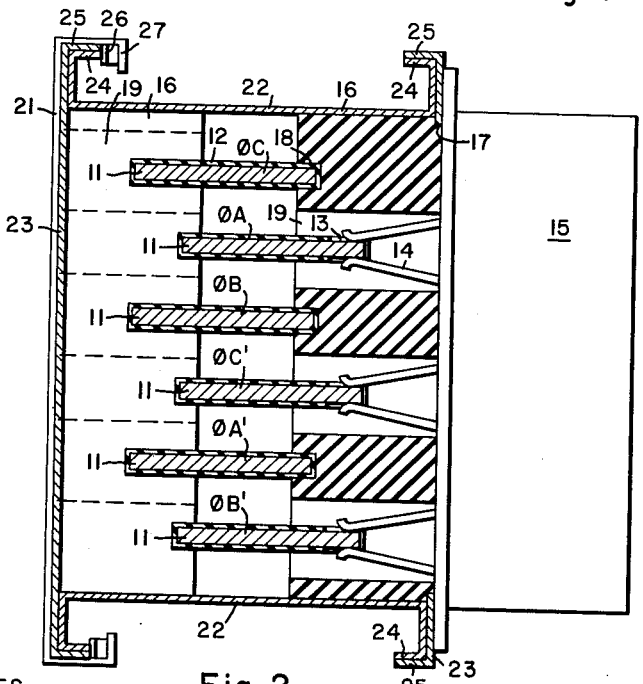
FIG. 2 is a view, in section, showing a plug-in unit mounted on one side of the duct housing.

In order to reduce the overall impedance, the bus bars are spaced relatively closely together. Such a structure is commercially known as low-impedance or feeder bus duct. Because of the close spacing, each bus bar 11 is wrapped with insulating tape or otherwise covered with insulation 12 throughout its entire length except the end portions of the bus bars, shown in FIG. 3, which are connected to corresponding bars in an adjoining section and except at points 13 to be engaged by stab connectors or contact members 14 of a plug-in unit 15 which may be attached to the side of the housing 10 as shown in FIG. 2. The plug-in unit 15 may be attached to the housing by clamping devices (not shown) which may be of the type described in Patent 2,725,541 issued November 29, 1955, to W. F. Born and John Zipay.

The bus bars 11 are supported by insulators 16 disposed inside the housing 10. The insulators 16 are located at regular intervals along the housing and are staggered on opposite sides of the housing. The housing 10 is provided with openings 17 for receiving the stab connectors 14 of the plug-in units 15 and an insulator 16 is located at each opening 17. Each insulator is provided with slots or grooves 18 for receiving the edges of the bus bars 11. Each insulator also has three openings 19 extending therethrough for the stab connectors of a plug-in unit 15. A cover plate 21 is provided for each one of the openings 17 in the duct housing.

The housing 10 comprises generally channel-shaped top and bottom walls 22 and channel-shaped side walls 23. The top and bottom walls 22 have inwardly extending flanges 24 which are overlapped by flanges 25 on the side walls 23. As previously explained, the openings 17 for receiving the stab connectors of the plug-in units are located in the side walls 22 alternately on opposite sides. The openings in the opposite sides are offset from each other longitudinally of the housing.

The cover plates 21 are slidably mounted on the side walls 23 and may be retained in position by leaf springs 26 which are disposed between flanges 27 on the cover plate 21 and the edges of the flanges 24 and 25 on the housing. When it is desired to install a plug-in unit in a particular opening 17, the cover plate 21 may be slid along the housing to provide access to the opening 17.

The insulators 16 may be molded from a suitable insulating material. As previously stated, the insulators are provided with slots or grooves 18 for receiving the bus bars 11. As also previously explained, an insulator 16 is located at each opening 17 and is provided with three openings 19 for receiving the stab connectors 14 of a plug-in unit 15. It will be noted that the insulators 16 may be changed from one side of the duct housing to the other, thereby requiring only one mold for making the insulators.

Heretofore, it has not been considered practical to attach the plug-in units directly to the housing of a low-impedance bus duct since the main bus bars 11 are spaced closely together and because of the physical phase arrangement of the bus bars to give low impedance. That is, the bus bars are so close together that there is insufficient flashover distance between the bars of different phases and the bars have to be covered with insulation. In order to permit the plug-in units to be attached directly to the side of the housing 10 with the stab connectors engaging the bus bars, the insulation is removed or omitted only from every other one of the bus bars for a short distance opposite each opening 17 in the duct housing.

Furthermore, as shown most clearly in FIG. 2, every other one or alternate bus bars 11 are offset a sufficient distance toward the side of the housing having openings 17 therein to permit the offset bars to be engaged by the stab connectors 14 of the plug-in units. Thus, the stab connectors for the units on one side of the housing engage uninsulated portions of bus bars for phases A, C and B and the stab connectors for the plug-in units on the opposite side of the housing engage uninsulated portions of the bars for phases C, B and A.

Thus, the stab connectors engage an uninsulated portion of each one of three phase bars and insulated portions of the other phase bars are disposed adjacent to the stab connectors. Therefore, sufficient flashover distance is maintained and there is no danger of a stab connector which engages one phase bar coming in contact with an uninsulated portion of another phase bar.

Furthermore, since the phase bars are equally spaced, the stab connectors of the plug-in units are also equally spaced. However, the stab connectors for each plug-in unit are offset from the longitudinal center line of the housing. Therefore, a plug-in unit can be installed in only one position on one side of the housing, thereby insuring that the stab connectors for the plug-in units on one side of the housing always engage the same phase bars so that the connections to the plug-in units have the same phase sequence. However, the same plug-in units may be installed in the opposite position on the other side of the housing with the stab connectors engaging different phase bars and the connections to the plug-in units having a different phase sequence. Thus, the load on the phase bars may be equalized by installing plug-in units on both sides of the housing.

As previously explained, the ends of the bus bars 11 are so spaced that they may be connected to the ends of corresponding phase bars in an adjoining bus duct section. Thus an entire run of duct may be composed of sections constructed in the manner herein described. Accordingly, power may be taken from a low-impedance or feeder duct structure by merely installing a plug-in unit or units at any desired point along the structure. It is not necessary to turn off the power from the bus duct system in order to install a plug-in unit. Therefore, an interruption in the operation of the equipment normally supplied with power through the bus duct system is avoided.

The ability of the structure to withstand short circuit stresses may be increased by providing additional insulators 28 between the plug-in type insulators 16 as shown in FIGS. 3 and 4. Oppositely disposed insulators 28 are drawn against the bus bars 11 by bolts 29 which extend through the insulators as shown in FIG. 4. A pair of the insulators 28 may be located adjacent to the ends of the bus bars 11 which are connected to corresponding bars in an adjoining section and additional pairs may be located at regular intervals along the bus duct, thereby firmly supporting the bus bars.

From the foregoing description, it is apparent that the invention provides a bus duct structure having the advantages of both low impedance and plug-in features. Furthermore, the present bus duct is simple in structure and may be economically manufactured and installed.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a three-phase bus duct, in combination, a housing of generally rectangular cross section, said housing having spaced openings in opposite sides thereof, the openings in opposite sides being offset from each other longitudinally of the housing, at least six bus bars disposed in the housing, said bars being equally and closely spaced vertically with adjacent bars being of a different phase to provide a low impedance characteristic, alternate bars being offset horizontally toward the opposite sides of the housing having the openings therein, and a plug-in unit having stab connectors disposed in a single plane transversely of the housing and extending through one of said openings in the housing and spaced to engage directly the alternate bus bars which are offset toward the side of the housing on which the plug-in unit is mounted to facilitate their engagement by the stab connectors.

2. In a three-phase bus duct, in combination, a housing of generally rectangular cross section, said housing having spaced openings in opposite sides thereof, at least six bus bars disposed in the housing, said bars being equally and closely spaced in one direction with adjacent bars being of a different phase to provide a low impedance characteristic, alternate bars being offset toward the opposite sides of the housing having the openings therein, said bars being in planes perpendicular to said sides, and a plug-in unit having stab connectors disposed in a single plane transversely of the housing and extending through one of said openings and spaced to engage directly the alternate bus bars which are offset toward the side of the housing on which the plug-in unit is mounted to facilitate their engagement by the stab connectors.

3. In a bus duct, in combination, a housing, a plurality of substantially flat bus bars disposed in the housing and insulated throughout substantially their entire length, each bar being in a different plane parallel to the planes of the other bars, said planes being closely spaced equal distances apart with adjacent bars being of a different phase to provide a low impedance characteristic, openings in the sides of the housing opposite the edges of the bus bars, alternate bars being offset toward the sides of the housing having the openings therein, each bar having uninsulated portions opposite said openings, and a plug-in unit having stab connectors disposed in a single plane transversely of the housing and extending through one of said openings and spaced to engage directly uninsulated portions of alternate bus bars.

4. In a bus duct, in combination, a housing, a plurality of substantially flat bus bars disposed in the housing and insulated throughout substantially their entire length, each bar being in a different plane parallel to the planes of the other bars, said planes being closely spaced equal distances apart with adjacent bars being of a different phase to provide a low impedance characteristic, openings in the sides of the housing opposite the edges of the bus bars, alternate bars being offset toward the sides of the housing having the openings therein, each bar having uninsulated portions opposite said openings, a plug-in unit having stab connectors disposed in a single plane transversely of the housing and extending through one of said openings and spaced to engage directly uninsulated portions of alternate bus bars, insulators disposed inside the housing and having slots therein for the edges of the bus bars, each insulator having openings therethrough at alternate slots for stab connectors of a plug-in unit, said insulators being changeable from one side of the housing to the opposite side, and additional oppositely disposed insulators clamped against the bus bars between the plug-in insulators.

5. In a three-phase bus duct, in combination, a housing of generally rectangular cross section, said housing having spaced openings in opposite sides thereof, at least six bus bars disposed in the housing with the planes of the bars being perpendicular to the sides of the housing having the openings therein, said bars being insulated throughout substantially their entire length, said bars being equally and closely spaced in one direction with adjacent bars being of a different phase to provide a low impedance characteristic, alternate bars being offset towards said opposite sides with at least half the width of the bars overlapping, each bar having uninsulated portions opposite said openings, and a plug-in unit having stab-connectors disposed in a single plane transversely of the housing and extending through one of said openings and equally spaced to engage directly uninsulated portions of alternate bus bars.

References Cited in the file of this patent

UNITED STATES PATENTS

| | | |
|---|---|---|
| 1,913,552 | Jackson | June 13, 1933 |
| 2,251,403 | Frank et al. | Aug. 5, 1941 |
| 2,261,857 | Novak et al. | Nov. 4, 1941 |
| 2,322,799 | Frank | June 29, 1943 |
| 2,495,526 | King | Jan. 24, 1950 |
| 2,576,774 | Carlson | Nov. 27, 1951 |
| 2,906,811 | Fisher | Sept. 29, 1959 |